US008379529B2

(12) United States Patent
Callaway, Jr. et al.

(10) Patent No.: US 8,379,529 B2
(45) Date of Patent: Feb. 19, 2013

(54) DISTRIBUTED SPECTRUM ALLOCATION SCHEME FOR COGNITIVE RADIO

(75) Inventors: Edgar H. Callaway, Jr., Boca Raton, FL (US); Monique B. Brown, San Jose, CA (US); Paul E. Gorday, West Palm Beach, FL (US); David E. Taubenheim, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1519 days.

(21) Appl. No.: 11/857,911

(22) Filed: Sep. 19, 2007

(65) Prior Publication Data

US 2009/0074032 A1    Mar. 19, 2009

(51) Int. Cl.
*H04L 1/00* (2006.01)
*H04W 4/00* (2009.01)
(52) U.S. Cl. .................. 370/252; 370/329; 370/468
(58) Field of Classification Search .................. None
See application file for complete search history.

(56) References Cited

U.S. PATENT DOCUMENTS

| | | | |
|---|---|---|---|
| 7,436,788 B2 | 10/2008 | Huschke et al. | |
| 8,060,104 B2 | 11/2011 | Chaudhri et al. | |
| 8,139,496 B2 | 3/2012 | Stanforth et al. | |
| 8,145,230 B2 * | 3/2012 | Callaway et al. | 455/452.2 |
| 2005/0128971 A1 | 6/2005 | Huschke et al. | |
| 2006/0083205 A1 | 4/2006 | Buddhikot et al. | |
| 2006/0083296 A1 | 4/2006 | Bhattacharjee et al. | |
| 2007/0211680 A1 | 9/2007 | Laroia et al. | |
| 2008/0130519 A1 * | 6/2008 | Bahl et al. | 370/254 |
| 2009/0207800 A1 | 8/2009 | Shan et al. | |
| 2010/0248764 A1 | 9/2010 | Callaway et al. | |
| 2011/0032892 A1 | 2/2011 | Bahl et al. | |

OTHER PUBLICATIONS

Choi, Noun; Patel, Maulin; Venkatesan, S., "A Full Duplex Multi-Channel MAC Protocol for Multi-hop Cognitive Radio Networks", 1st International Conference on Cognitive Radio Oriented Wireless Networks and Communications, Jun. 2006, 5 pages.
Thoppian, M.; Venkatesan, S.; Prakash, R.; Chandrasekaran, R., "MAC-layer Scheduling in Cognitive Radio based Multi-hop Wireless Networks", International Symposium on a World of Wireless, Mobile and Multimedia Networks, Jun. 2006, 10 pages.
PCT International Search Report Application No. PCT/US2008/075856 Dated Mar. 25, 2009—11 Pages.
Ian F. Akyildiz, et al., "Next Generation/Dynamic Spectrum Access/Cognitive Radio Wireless Networks: A Survey", Computer Network, vol. 50, pp. 2127-2159, May 17, 2006—33 Pages.
International Preliminary Report on Patentability and Written Opinion for counterpart International Application No. PCT/US2008/075856 mailed on Apr. 1, 2010.
Non Final Office Action mailed Jun. 20, 2012 in related U.S. Appl. No. 12/415,864, Edgar H. Callaway Jr., filed on Mar. 31, 2009.
Perkins, C., E., and Royer, E., M., "Ad hoc On-Demand Distance Vector Routing." Proceedings of the 2nd IEEE Workshop on Mobile Computing Systems and Applications, Feb. 1999, pp. 90-100.
Notice of Allowance mailed Aug. 22, 2012 in related U.S. Appl. No. 12/415,864, Edgar H. Callaway Jr., filed on Mar. 31, 2009.

*Primary Examiner* — Steven H Nguyen
(74) *Attorney, Agent, or Firm* — Barbara R. Doutre

(57) ABSTRACT

A technique (300) and apparatus for sharing frequency spectrum amongst cognitive radios is provided. By maintaining an unoccupied spectral quantum between each CR device, the channel technique ensures that a device just beginning transmissions in the CR frequency band will have spectrum from which to start growing. The growth can continue up to the maximum the spectrum can support, when the bandwidth of each device has been reduced to one spectral quantum, and there are no available spectral quanta left.

18 Claims, 4 Drawing Sheets

*321*
NO FENCE
QUANTA

*323*
BW = BW - 2

*325*
BW = BW - 1

*327*

*329*
YES FENCE
QUANTA

*331*
TWO FENCE
QUANTA

*333*
EXACTLY ONE
FENCE
QUANTUM

*335*
$T_g = 0$,
BW = BW + 2

*337*
$T_g \neq 0$,
BW = BW - 1

*339*
$T_g = 0$,
BW = BW
FENCE
QUANTUM
SHIFTS

DISTRIBUTED SPECTRUM ALLOCATION SCHEME FOR COGNITIVE RADIO

TECHNICAL FIELD

This invention relates in general to communication systems and more particularly to spectrum allocation for cognitive radio systems.

BACKGROUND

Cognitive radios (CR) utilize a variety of co-existence techniques in order to attempt to operate successfully along with existing wireless communication systems, architectures and other CR devices. The CR concept is generally intended to enable frequency band sharing and reuse with incumbent users and/or other CR devices. The manner by which CR performance can be increased or extended, via the use of advanced cognitive techniques, is of current interest in the communications arena.

The ability to share spectrum efficiently amongst existing CR devices presents challenges to designers of communication systems. Most spectral allocation techniques utilize a centralized control; however, a centralized control has the disadvantage of presenting a single point of failure. Even in a spectrum cleared of other users (i.e. cleared of incumbent users), achieving fair channel access among cooperating, yet independent, CR devices can be problematic. The ability for a new CR device to join a CR system and access the spectrum without having to undergo major changes to global infrastructure or coordinating access points of local area networks is not trivial.

Accordingly, it would be beneficial to have a CR device and CR system capable of efficient spectrum sharing.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
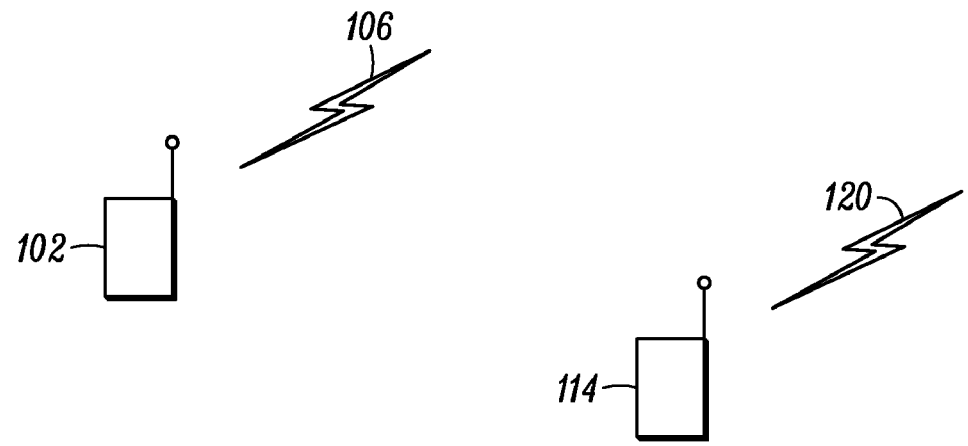
FIG. 1 is a plurality of cognitive radio (CR) devices operating in accordance with various embodiments of the invention.
Figure 1:
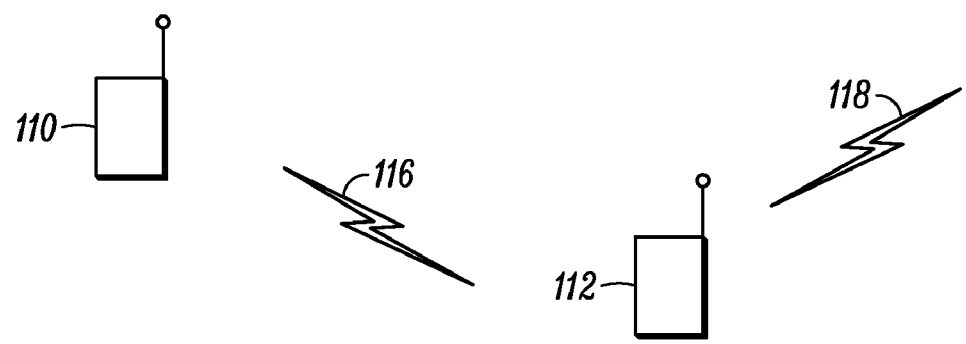

While the specification concludes with claims defining the features of the invention that are regarded as novel, it is believed that the invention will be better understood from a consideration of the following description in conjunction with the drawing figures, in which like reference numerals are carried forward.

The present invention may be embodied in several forms and manners. The description provided below and the drawings show exemplary embodiments of the invention. Those of skill in the art will appreciate that the invention may be embodied in other forms and manners not shown below. The invention shall have the full scope of the claims and shall not be limited by the embodiments shown below. It is further understood that the use of relational terms, if any, such as first, second, top and bottom, front and rear and the like are used solely for distinguishing one entity or action from another, without necessarily requiring or implying any such actual relationship or order between such entities or actions.

For the purposes of this application the term "bandwidth" is defined as the spectrum occupied by a transmitted signal, and is not intended to be equated to the term "data rate" which is the number of bits transmitted per unit time. For the purposes of this application, the term band-edge is defined as an outer spectral edge of a transmitted signal's bandwidth. For the purposes of this application, the term "spectral quantum" is defined as the smallest spectral bandwidth that a CR device may occupy or, equivalently, the smallest amount by which the bandwidth of a CR device may be changed. The term "fence quanta" of a device is defined as the spectral quanta immediately above and below (in frequency) the transmitted signal of a device, and is not intended to be equated to the term "guard-band", which is/as used in/refers to the unused bandwidth separating channels, employed, for example, to ensure that they do not interfere with one another. It is possible to have a single fence quantum on only one side of a transmitted signal, the other side of the transmitted signal's bandwidth abutting an adjacent signal's bandwidth. It is also possible to have no fence quanta present around a transmitted signal, and both sides of the transmitted signal's bandwidth abutting an adjacent signal's bandwidth. For the purposes of this application, a narrowband signal is considered to be a signal having the width of one spectral quantum.

Briefly in accordance with the present invention, there is provided herein a method and apparatus for achieving fair channel access among cooperating, yet independent, cognitive radio (CR) devices. A distributed channel access technique, one without centralized control, is achieved by introducing a signal bandwidth variable into the channel access technique. By introducing a signal having the width of a spectral quantum into available spectrum, growing the bandwidth rapidly at first and then slowing the rate of growth as occupied bandwidth increases, fair spectrum sharing by independent CR devices via the distributed technique is achieved. By maintaining an unoccupied spectral quantum between each CR device's transmission signal, the technique ensures that a device just beginning transmissions in the CR frequency band will have spectrum from which to start growing (up to the maximum the spectrum can support, when the bandwidth of each device has been reduced to one spectral quantum, and there is no available spectral quanta left).

The channel access technique of the present invention applies to cognitive radio applications. The technique starts by transmitting a narrow-bandwidth signal, one spectral quantum in width, in the largest contiguous free (idle) segment of the available spectrum. The technique then grows the transmitted occupied bandwidth over time, at a rate that is a monotonically decreasing function of the occupied bandwidth, until there is only one spectral quantum (a fence quantum) between the device and each of its adjacent spectral neighbors. It is noteworthy to point out that the growth rate is a function of the occupied bandwidth, not time. Although the growth rate and bandwidth are related during the growth phase, these parameters are not related in the steady state, where the bandwidth may stay substantially constant indefinitely as time moves on.

While the growth process continues (meaning that the fence quanta will be occupied by the transmitting device from time to time), a second process begins, in which the fence quanta are monitored prior to each transmission. Should the fence quanta be found occupied, the device reduces its occupied bandwidth during its next transmission so as to recreate a fence quantum between the device and each of its spectrally adjacent neighbors.

If the device occupies less bandwidth than one of its neighbors, it will occupy the fence quantum more often than the larger neighbor (since the growth rate is a decreasing function of occupied bandwidth). The present device will therefore cause the larger spectral neighbor to reduce its occupied bandwidth more often, while the present device increases its occupied bandwidth. The technique therefore works to equalize the occupied bandwidth of all users.

Figure 2:
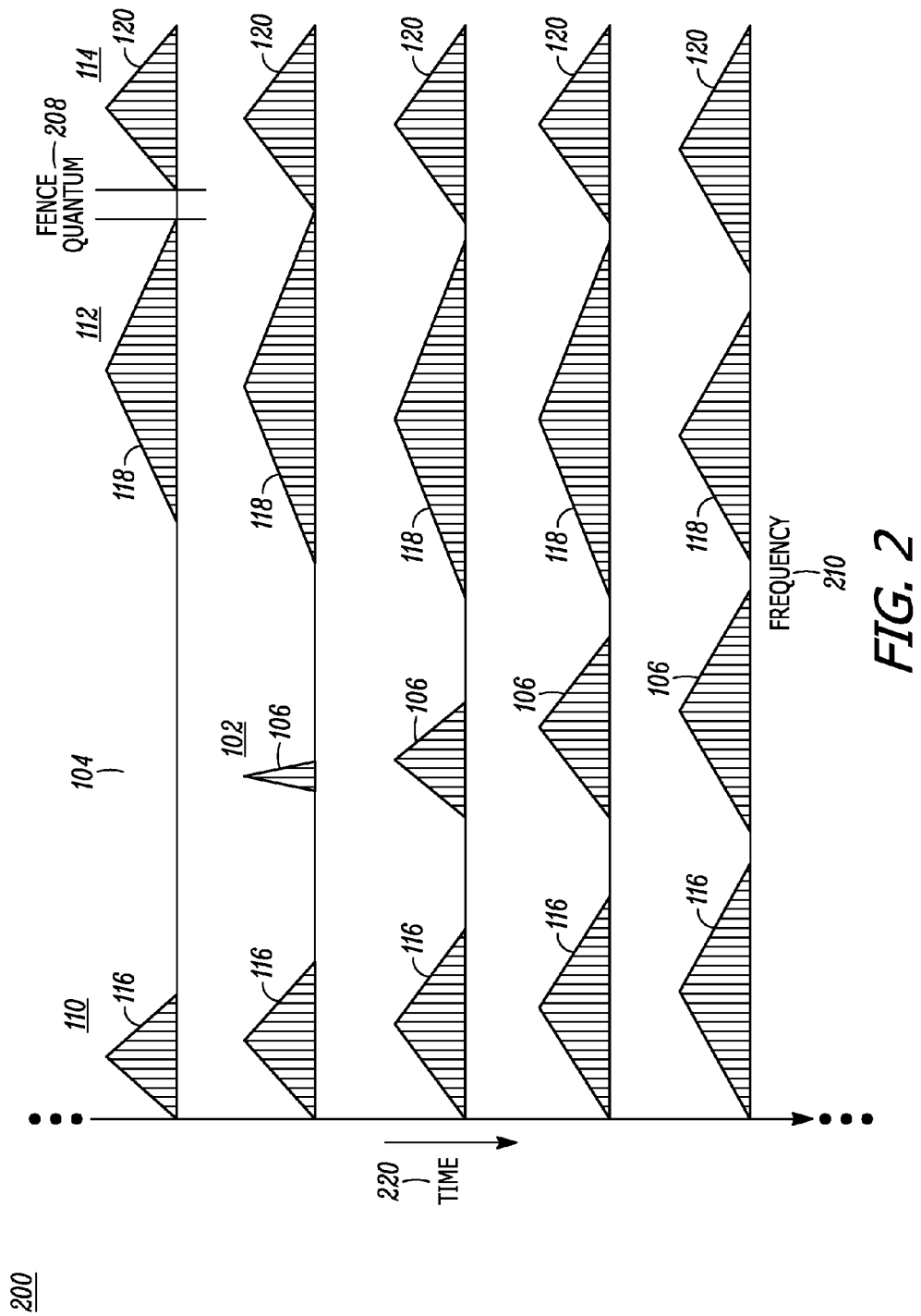
FIG. 2 is illustrates an example of trading bandwidth over time to achieve a steady state operation in accordance with various embodiments of the invention.

Referring to FIG. 1, there is shown a plurality of active cognitive radio (CR) devices 100. FIG. 2 illustrates an example of trading bandwidth frequency 210 over time 220 to achieve a steady state operation in accordance with various embodiments of the invention. Referring to FIGS. 1 and 2, the plurality of CR devices 100 may be part of the same network communicating with each other or may be independent devices from different services, users, owners, etc. The plurality of CR devices are represented by active CR devices 102, 110, 112, 114, each active CR transmitting signals 106, 116, 118 and 120 respectively. In accordance with this embodiment of the invention, each CR device is capable of identifying open frequency spectrum and transmitting a narrowband signal, one spectral quantum in width, within a segment of the open frequency spectrum. As seen in FIG. 2, CR devices 110, 112, 114 are already in the process of adjusting/widening their respective signals, while CR device 102 introduces transmission signal 106 within spectrum segment 104. In this example, active CR device 102 identifies open frequency spectrum 104 and transmits a signal 106, one spectral quantum in width, preferably within a center segment of the open frequency spectrum, as shown in the second time instance of 220. Each CR device widens its signal until a fence quantum 208 is reached. Eventually, the fence quantum 208 separates each active CR device's transmission signal from adjacent spectral neighboring transmission signals on either side. The neighboring active CR devices 110, 112 and other CR device 114 attempt to increase their respective bandwidths at rates that are a function of each CR device's occupied bandwidth, while decreasing their respective bandwidths when necessary to maintain their fence quanta 208, such that, over time 220, the bandwidth amongst all the active CR devices 102, 110, 112, 114 equilibrate with fence quanta 208 therebetween.

Continuing to refer to FIGS. 1 and 2, in accordance with another embodiment of the invention, the growth rate and starting bandwidths of each CR device 102, 110, 112, and 114 may vary to accommodate different quality of service (QoS) requirements for each CR device. Again, to achieve channel access among the cognitive radio devices 102, 110, 112, 114 control is distributed amongst the CR devices, without the use of a single centralized control. By verifying the QoS requirements for the CR devices, equal sharing of spectrum is provided to the CR having equal QoS requirements. In cases where the QoS are not equal, spectrum is assigned to the CR devices with weighted proportion to each CR device's QoS needs. A distributed channel access technique is thus provided that, in the steady state, produces substantially equal sharing of spectrum among CR devices having QoS requirements. A device with higher QoS requirements can have those requirements met by two mechanisms. Firstly, the growth rate of high-QoS devices can be accelerated, and secondarily these devices can start from a larger initial occupied bandwidth (i.e., several spectral quanta). Since the fence quanta are (almost) always available, new devices entering the system will always have a place in the spectrum from which to start growing.

Figure 3:
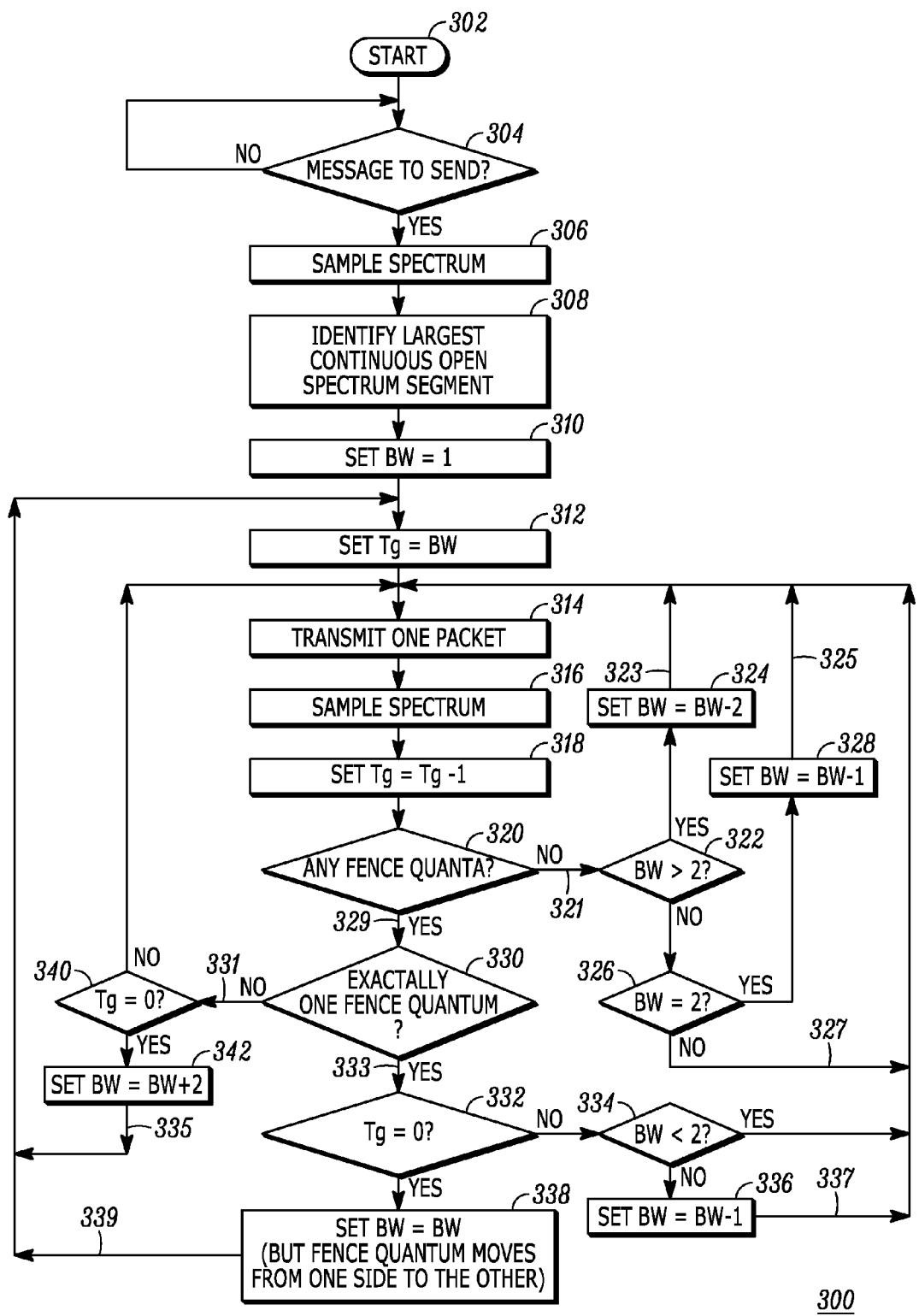
FIG. 3 is a technique for a cognitive radio to share spectrum with other cognitive radios in accordance with various embodiments of the invention.
Figure 4:
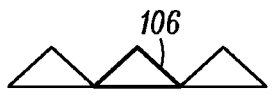
FIG. 4 illustrates examples of various signal bandwidth adjustments and fence locations that may occur throughout the technique of FIG. 3.
Figure 4:
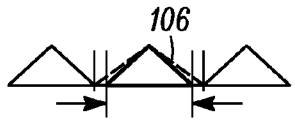
Figure 4:
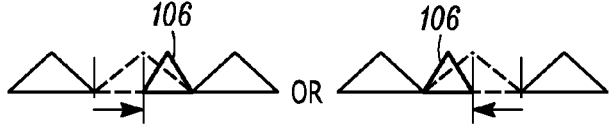
Figure 4:
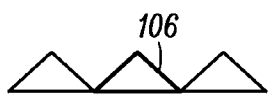
Figure 4:
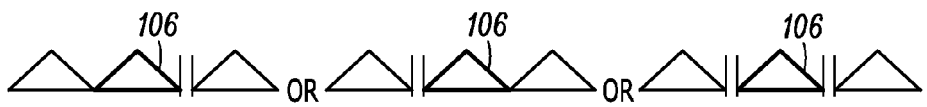
Figure 4:
Figure 4:
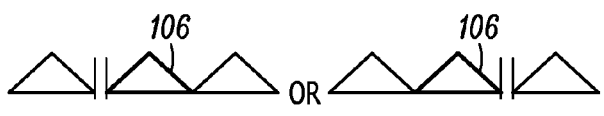
Figure 4:
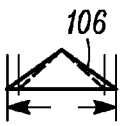
Figure 4:
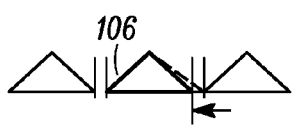
Figure 4:
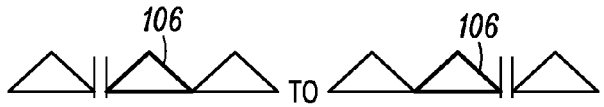

FIG. 3 is a technique for a cognitive radio to share spectrum with other cognitive radios in accordance with an embodiment of the invention. Technique 300 begins at 302 with a CR device, such as CR device 102, determining that it desires to send a message at 304. Upon determining to send a message at 304, the CR device 102 samples frequency spectrum at 306 to identify, preferably but not necessarily the center, of preferably but not necessarily the largest continuous open spectrum segment at 308. Upon identifying this center, the CR device 102 sets the bandwidth for the transmission signal to a narrowband setting having a spectral quantum of one (BW=1) at step 310. A timer for tracking time to grow (Tg) is set to the bandwidth (Tg=BW) at step 312, and the CR device 102 begins transmitting a signal (e.g. a packet), one spectral quantum in bandwidth, at 314 and sampling the spectrum at 316. The growth timer (Tg) is decremented at 318 in response to the packet transmission. The CR device 102 checks the spectrum sampled at 316, checking whether any fence quanta exist at 320. Depending on the existence and amount of fence quanta in the sampled spectrum, the spectrum sharing technique 300 adjusts the transmission signal's bandwidth until the growth counter times out. FIG. 4 will be discussed in conjunction with technique 300 to provide examples of the various signal bandwidth adjustments and fence locations.

If no fence quanta exist at 320, meaning neighboring signals are right next to the transmitted signal. (FIG. 4, 321) then the bandwidth is checked to determine whether it has a spectral quanta greater than two (BW>2) at 322. If the BW spectral quanta is greater than two at 322, then transmitted signal's bandwidth is decreased by a spectral quanta of two at 324 (thus attempting to form fence quanta on either side of the CR 102's transmission signal 106 (FIG. 4, 323). The technique 300 then returns to CR 102 transmitting a new packet at 314.

If at step 322, the spectral bandwidth quanta was not greater than two, but equal to two (BW=2) at 326, then it is only possible to decrement by the spectral bandwidth quanta by one (BW=BW−1) at 328. This will result in fence quanta on either side of transmission signal 106 (FIG. 4, 325). Drawings are illustrative purposes only and not intended to be to t to scale.

If the spectral bandwidth is not equal to two spectral quanta at 326, leaving the only possibility that BW=1, then the bandwidth of transmission signal 106 must remain at one (FIG. 4, 327) because one spectral quantum is the minimum possible bandwidth, and a packet is sent at 314.

Returning to step 320, technique 300 considers the scenario when fence quanta exist by checking at 330 whether exactly one fence quantum exists. If exactly one fence quantum does not exist, meaning there are two fence quanta, then the growth counter is checked at 340. If the growth counter has not reached zero at 340, then a new packet is transmitted at 314. If the growth counter has reached zero at 340, then the transmission signal's bandwidth is increased by two spectral quanta (BW=BW+2) at 342 (FIG. 4, 335) and the technique returns to 312 where the growth counter is set to the new bandwidth (Tg=BW) prior to a new packet being sent at 314.

If the fence quanta is exactly one at 330, this means that a single fence abuts the band-edge on one side of the transmission signal 106 and no fence exists on the other side (i.e. an adjacent signal abuts the transmission signal 106 on the other band-edge) (FIG. 4, 333). The growth counter is then checked at 332, and if the counter has not reached zero, then the bandwidth is checked to see if the bandwidth is less than two spectral quanta (BW<2) at 334.

If the bandwidth is less then two spectral quanta at 334, this is an indication that there is not enough room to decrease the bandwidth of transmission signal 106, and the technique simply returns to 314 to send another packet. If at 334 it is determined that the bandwidth is large enough (i.e. BW is equal to two or greater than two), then the bandwidth is decreased by one spectral quantum at 336 (BW=BW−1) to create a fence quanta on both sides of the transmission signal 106 FIG. 4, 337) prior to transmitting a new packet at 314.

If the growth counter did reach zero at 332, then the bandwidth of the transmission signal 106 remains unchanged at 338, but fence quanta is shifted over such that it is in between the transmission signal 106 and the previously adjacent signal (FIG. 4, 339). The technique 300 then returns to 312 to set the growth counter to bandwidth (Tg=BW) and a new packet is then transmitted at 314.

Accordingly, by maintaining an unoccupied spectral quantum between each CR device, the channel technique operating in accordance with the invention, ensures that a device just beginning transmissions in the CR frequency band will have spectrum from which to start growing. The growth can continue up to the maximum the spectrum can support, when the bandwidth of each device has been reduced to one spectral quantum, and there is no available spectral quantum left.

In the case where QoS parameters are considered, the time to grow (Tg) counter within technique 300 can be set to:

$$Tg=BW/QoS \text{ where QoS=low=1}.$$

The higher the value of the QoS parameter, the lower will be the starting Tg counter value. The Tg counter will thus reach zero more quickly. Over time, therefore, with a high QoS value the decision at step 340 will be "Yes" more often than with a lower value of QoS, leading to step 342 more often, and faster growth. To ensure integer values are achieved for each calculation of Tg, a rounding up mathematical function can be applied, such as Tg=ceil(BW/QoS) thereby ensuring that Tg is always at least one. Thus for example, when BW=7 and QoS=6, then Tg=2.

In another embodiment of the present invention, the transmitting device limits its bandwidth to be less than a predetermined maximum bandwidth threshold. This may be desirable, for example, when the device is incapable of transmitting signals with bandwidths greater than the threshold. In this embodiment, the decision in steps 332 and 340 is augmented to also consider the predetermined threshold. To achieve a "Yes" result in these steps, the growth counter must reach zero and the bandwidth must be less than the threshold; otherwise, the "No" decision is made.

In another embodiment, the growth rate can increase at a rate of one quantum per transmission until a neighboring signal presents itself. Thus, in cases with wide open frequency spectrum, the rate at which a signal is transmitted need not be slowed down until the presence of another signal, separated from the transmitted signal by one fence quanta, presents itself.

In another embodiment of the present invention, the transmitting device does not sample spectrum in steps 306 and 316, but instead determines the presence or absence of fence quanta from information received from a third party. This third party may be, for example, a spectrum broker or agent, or a database of spectrum occupancy information.

While the counter Tg has been described in terms of being decremented to a value of zero, the counter may alternatively be set to another threshold or be incremented to an alternative threshold as well.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for a cognitive radio to share spectrum, comprising:
   identifying, by a cognitive radio, open spectrum within which to transmit a signal;
   transmitting the signal in a bandwidth within the open spectrum;
   determining, by the cognitive radio, the presence and absence of fence quanta about the transmitted signal in the spectrum; and
   adjusting a band-edge setting of the bandwidth within the open spectrum for a subsequent transmit signal, by the cognitive radio, in response to the presence and absence of fence quanta.

2. The method of claim 1 wherein the transmission signal does not exceed a predetermined maximum bandwidth threshold.

3. The method of claim 1, wherein the step of transmitting comprises introducing a transmission signal having one spectral quantum in width into the spectrum.

4. A method for a cognitive radio to share spectrum with other cognitive radios, comprising:
   identifying a segment of continuous open spectrum;
   setting a bandwidth for a transmission signal within the segment;
   setting a counter in response to setting the bandwidth;
   transmitting a transmission signal with the set bandwidth;
   determining the presence or absence of fence quanta about the transmission signal;
   adjusting the counter in response to transmitting the transmission signal; and
   adjusting the bandwidth of a subsequent transmission signal in response to the fence quanta.

5. The method of claim 4, wherein the step of adjusting the bandwidth comprises:
   increasing the bandwidth utilizing a growth rate that is a monotonically decreasing function of bandwidth.

6. The method of claim 4, the step of adjusting the bandwidth comprises:
   increasing the bandwidth at a constant rate until a single spectral quantum separates the CR device from neighboring devices operating within the spectrum.

7. The method of claim 4, wherein the step of adjusting the bandwidth comprises:
   decreasing the bandwidth of the subsequent transmission signal by two spectral quanta when no fence quanta are determined to be present and the transmission signal has a bandwidth of spectral quanta greater than two;
   decreasing the bandwidth by a spectral quantum of one when no fence quanta are determined to be present and the transmission signal bandwidth is set to two;
   leaving the bandwidth unchanged when no fence quanta are determined to be present and the transmission signal bandwidth is less than two;
   leaving the bandwidth unchanged when exactly one fence quantum is determined to be present and the counter has been decremented to zero;

decreasing the bandwidth by a spectral quanta of one when exactly one fence quantum is determined to be present and the transmission signal bandwidth is greater than or equal to two;

increasing the bandwidth by a spectral quanta of two when more than one fence quantum is determined to be present and the counter has been decremented to zero; and setting the counter equal to the adjusted bandwidth value prior to transmission of another transmission signal.

8. The method of claim 7, further comprising leaving the bandwidth unchanged when exactly one fence quantum is determined and the counter has reached zero.

9. The method of claim 4, where the counter is adjusted based on bandwidth and quality of service (QoS) parameters of the CR radio.

10. A method for a cognitive radio (CR) device to share spectrum with other CR devices, comprising:

distributing control amongst the CR devices, without using one centralized control;

identifying open spectrum segments;

transmitting a signal in a bandwidth within an identified open spectrum segment, from each CR device;

adjusting the bandwidth of each transmitted signal, by each CR device, based on at least one of the presence, absence and quantity of spectral quanta about each CR device's transmitted signal.

11. The method of claim 10, further comprising:

identifying the quality of service (QoS) requirements for the CR devices;

providing equal sharing of spectrum among the CR devices having equal QoS requirements; and assigning spectrum to CR devices with weighted proportion to each CR device's QoS needs when the QoS requirements amongst the CR devices are not equal.

12. The method of claim 11, wherein the bandwidth is adjusted at a rate that is a function of BW/QoS.

13. A communication system, comprising:

a first CR device transmitting a signal of a first bandwidth within an idle portion of spectrum, the first CR device transmitting subsequent signals of increasingly larger bandwidth utilizing a growth rate that is a monotonically decreasing function of bandwidth, until a single spectral quantum separates the first CR device's bandwidth from that of first and second neighboring spectral CR devices on either side, thereby establishing steady state mode of operation.

14. The communication system of claim 13, wherein the single spectral quantum provides a fence quantum and during the steady state mode of operation the CR device and one of the adjacent neighboring devices compete for the fence quantum.

15. The communication system of claim 13, wherein growth rate is inversely proportional to the occupied bandwidth of the device.

16. The communication system of claim 15, further comprising a new CR device transmitting a minimum bandwidth signal in the fence quantum and entering the communication system in a steady state mode.

17. The communication system of claim 16, wherein the new CR device transmit signal increases in bandwidth until the first CR device, the new CR device, and an adjacent neighboring device have substantially the same occupied bandwidth.

18. The communication system of claim 13, wherein the first CR device transmits subsequent signals of increasingly larger bandwidth by adjusting the band-edge setting of the first bandwidth.

* * * * *